R. & S. BASCH.
TIRE.
APPLICATION FILED SEPT. 23, 1907. RENEWED JAN. 18, 1910.
950,985.
Patented Mar. 1, 1910.
2 SHEETS—SHEET 1.
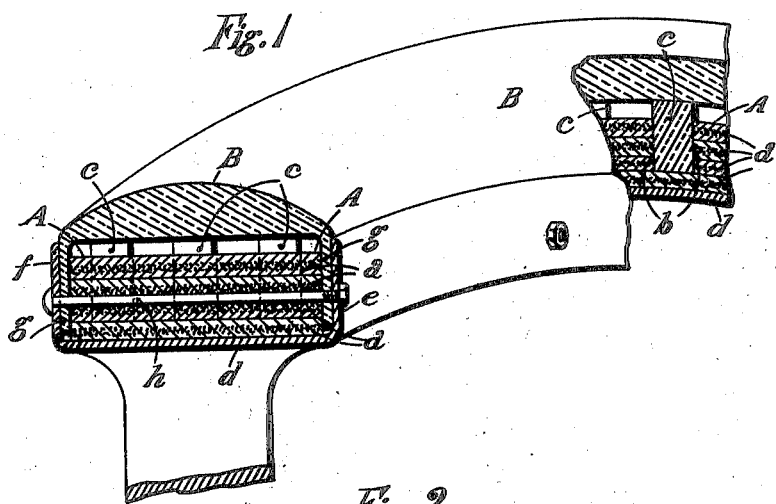
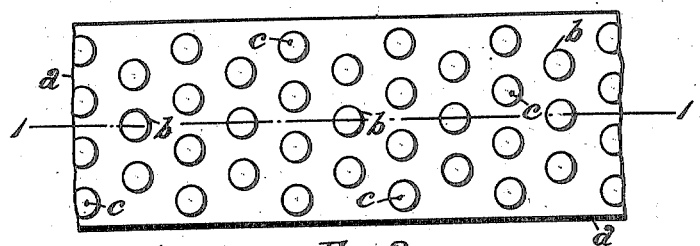
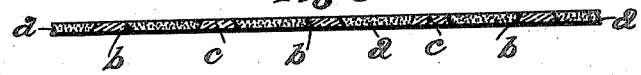
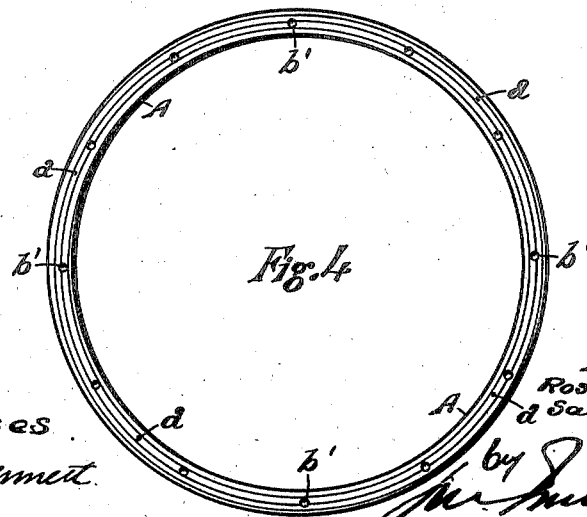
Witnesses
Alice H. Bennett
Helen H. Murray
Inventors
Rose Basch
Samuel Basch
by
Atty

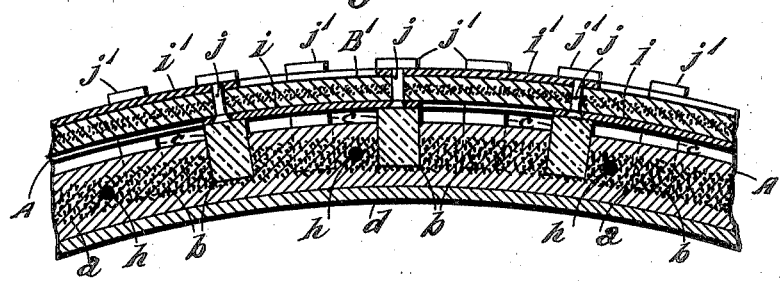
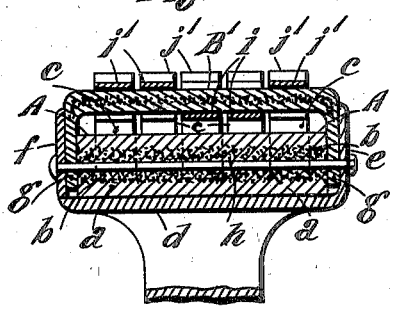
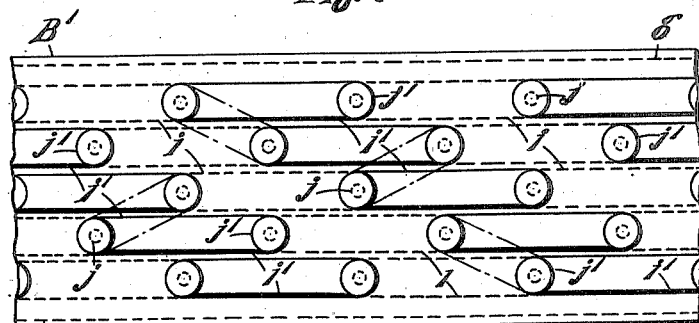

UNITED STATES PATENT OFFICE.

ROSE BASCH AND SAMUEL BASCH, OF LONDON, ENGLAND.

TIRE.

950,985. Specification of Letters Patent. Patented Mar. 1, 1910.

Application filed September 28, 1907, Serial No. 394,183. Renewed January 18, 1910. Serial No. 538,730.

*To all whom it may concern:*

Be it known that we, ROSE BASCH, wife of SAMUEL BASCH, and SAMUEL BASCH, of no occupation, subjects of the German Emperor, both residing at 71 New Bond street, W., London, England, have invented new and useful Tires, of which the following is a specification.

This invention relates to elastic tires for the wheels of vehicles and has for its object certain improvements in and relating thereto, whereby an efficient substitute for the more expensive rubber tire is provided, said substitute being applicable for use either alone or in combination with an outer cover or tread of vulcanized rubber.

The invention consists essentially in forming elastic tires of felt into which pieces of rubber have been embedded to give the requisite degree of resiliency and elasticity.

Having explained the nature and object of our present invention, we will now describe the manner in which it is carried into effect, reference being had to the accompanying drawings which illustrate convenient forms of elastic tires constructed in accordance with our improvements.

Figure 1 is a perspective view partly in section of a portion of the rim and tire of a wheel embodying one form of the present invention. Fig. 2 is a plan of a modified form of the substitute for rubber used in the construction of elastic tires in conformity with our improvements. Fig. 3 is a longitudinal section on the line 1—1 in Fig. 2. Fig. 4 is a side elevation of a tire built up from a continuous strip of the substitute shown in the two preceding figures. Fig. 5 is a longitudinal section through a further modified form of our improved elastic tire and illustrating a preferred method of protecting the outer surface of the tire from the wear and tear of running. Fig. 6 is a transverse section of same, and Fig. 7 is a plan of the improved outer protecting part.

Like letters of reference indicate the same or similar parts in the various figures.

According to the forms illustrated, a length, or sheets of felted or woven fabric hereinafter called felt, is, or are, perforated with holes $b$, $b$, of any convenient form or size, honeycomb like. These holes $b$, $b$, are filled with rubber studs or plugs $c$, $c$, which have not been vulcanized, after which the felt is vulcanized. Or, the holes $b$, $b$, in the felt strips $a$, $a$, may be plugged with rubber that has already been vulcanized. The studs or plugs $c$, $c$, may also be cemented into the felt, and the felt can be impregnated with rubber or other suitable substance, for the purpose of rendering it waterproof, and subsequently vulcanized, or not.

When the felt has been prepared in any of the above mentioned ways, it is cut up into strips or ribbons $a$, $a$, as shown, and then wound around and around the wheel rim, over each other, till the desired thickness of tire is acquired.

In Fig. 1 we have shown a tire in which the strips or ribbons $a$, $a$, have been first perforated with holes $b$, $b$, and then cemented together under pressure; the said holes $b$, $b$, being afterward fitted with vulcanized rubber studs $c$, $c$, of such a length as to project somewhat beyond the exterior surface of the outer layer $a$. Or, the tire may be first built up from the requisite number of strips $a$, $a$, and have the holes bored and studs fitted subsequently.

We may also fit up tires as hereinbefore referred to by first molding or shaping a single strip of felt $a$, of the desired thickness, see Figs. 5 and 6.

We further prefer to construct the tires in two parts, that is to say, an inner member A and an outer cover or tread B. The part B, may be of rubber, and the other A, Fig. 1, of felt prepared as above described; or both parts A and B may be composed of felt as shown by Figs. 5, 6 and 7.

According to one way of fitting our improved tire to the wheel rim $d$, we arrange the inner part A round the rim $d$, and place the outer cover B thereon, afterward bolting both parts firmly to the flanges $e$, $f$. In order to facilitate the connection and disconnection of the two parts A and B of the tire, the rim $d$ is provided with a fixed flange $e$ formed integrally therewith, and a removable one $f$.

$g$, $g$, are depending flanges or flexible webs from the outer cover B which serve to retain the same in position, as well as to prevent "creeping".

$h$, $h$ are retaining bolts which are passed through holes in the flanges $f$ and $e$, and through correspondingly inter-registering holes in both the webs $g$ $g$ and the inner part A.

It will be understood that by making the studs $c$, $c$ to project beyond the outer surface of the inner part A as described, the elasticity and resiliency of the improved tire is greatly enhanced.

In the form of our invention illustrated by Figs. 2, 3, and 4, the tire is made up from a continuous strip of felt $a$, studded with plugs $c$, $c$: and in this case said plugs $c$, $c$ are preferably fitted flush with both surfaces of the strip $a$, so that when wound upon itself, as shown in Fig. 4, a considerable amount of resiliency in the entire mass is obtained.

$b^1$, $b^1$ Fig. 4, indicate holes for the passage of the retaining bolts $h$, $h$.

We preferably employ washers or strips of metal $i$, $i$, $i^1$, $i^1$ respectively inside and outside the outer part or cover $B^1$ of the tire; in which case, said washers or strips are riveted thereto in a chain-like manner, that is to say, each end of every inner strip $i$, is connected by means of a rivet $j$, with one end of an outer strip $i^1$. Thus it will be seen that a continuous metal chain (or chains, as shown) is arranged around the cover $B^1$ the links of which are alternately disposed upon the outer and inner surfaces thereof. By connecting the metal strips $i$, $i^1$, as described, stretching of the felt is prevented.

The rivets $j$, $j$, which secure the washers or strips of metal $i$, $i^1$ to the outer part $B^1$ are provided with heads or enlargements $j^1$, $j^1$, upon which the tire is adapted to rest or run when in use; or the enlargements $j^1$, $j^1$ may be formed separately and connected to the washers $i^1$, $i^1$.

Each separate chain of washers may be connected to the adjoining ones by means of diagonally arranged strips, as shown by dot and dash lines in Fig. 7.

An outer cover $B^1$ protected and prepared in any of the foregoing manners, is placed over the inner part A and connected or fixed thereto as shown in reference to the accompanying drawings, or in any other convenient way.

The details of construction may be varied more or less as may be found desirable, and wheel tires constructed in the manner set forth will be found exceedingly durable while their elasticity and resiliency are effectively insured.

What we claim as our invention and desire to secure by Letters Patent is:—

1. A tire comprising felt, and provided with radial openings with rubber therein, the rubber in the radial openings being transverse of the thickness of the felt.

2. A tire comprising an inner layer of felt formed with radial openings, rubber fitting in the openings, and an outer cover fitted over the inner layer of felt.

3. A tire comprising an inner layer of superimposed layers of felt having openings, rubber fitted in the openings, and extending beyond the inner layer of felt, and an outer cover fitting over the inner layer of felt and rubber.

4. A tire comprising superimposed layers of compressed felt formed with openings, rubber fitting in the openings, the rubber extending beyond the outer surface of the felt layer, an outer cover having flanges which fit the sides of the felt layer, and bolts extending through the flanges and the layer of felt.

5. A tire comprising layers of superimposed felt, and having rubber embedded at intervals, said rubber extending entirely through one surface of the layer of felt.

6. A tire comprising layers of superimposed felt having openings, rubber fitted in the openings and extending beyond the outer surface of the layers of felt, a resilient cover having flanges, and bolts extending through the flanges and the layers of felt.

7. In combination, a tire comprising a ring formed with openings, rubber plugs fitting in the openings and extending beyond the outer surface thereof, a resilient cover having flanges, a wheel rim having flanges adjacent the flanges of the cover, one of the wheel flanges being detachable, and bolts passing through the flanges of the wheel and cover and the ring.

In witness whereof we have hereunto set our hands in the presence of two witnesses.

ROSE BASCH.
SAMUEL BASCH.

Witnesses:
ALFRED T. BRATTON,
FREDK. L. RAND.